Dec. 27, 1938.　　　E. C. HORTON　　　2,142,054
WINDSHIELD CLEANER
Filed Aug. 30, 1935
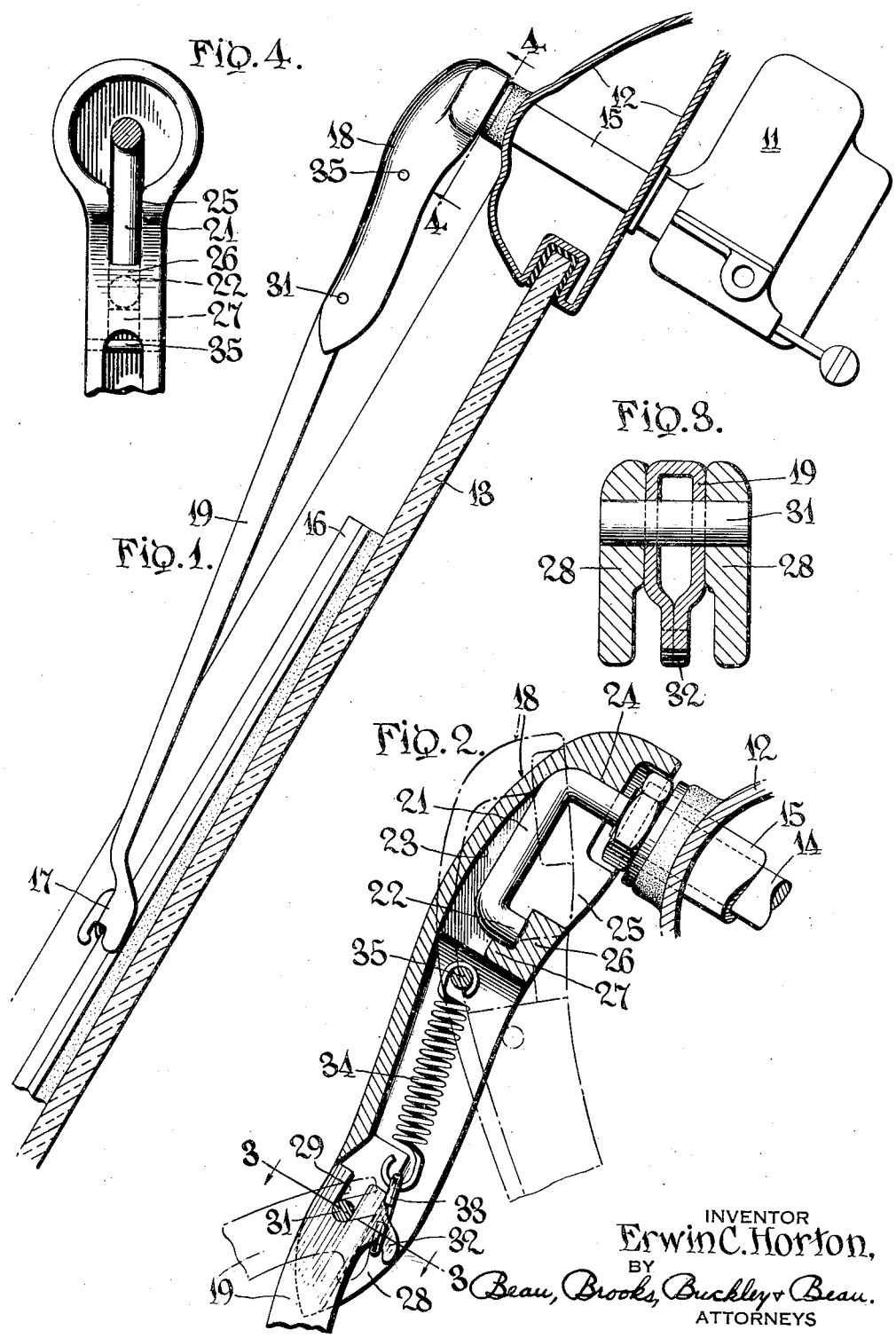
INVENTOR
Erwin C. Horton,
BY
Beau, Brooks, Buckley & Beau.
ATTORNEYS Patented Dec. 27, 1938

2,142,054

UNITED STATES PATENT OFFICE 2,142,054

WINDSHIELD CLEANER

Erwin C. Horton, Hamburg, N. Y., assignor to Trico Products Corporation, Buffalo, N. Y.

Application August 30, 1935, Serial No. 38,611

4 Claims. (Cl. 15—255)

This invention relates to windshield cleaners and particularly to improved means for attaching the wiper or blade carrying arm to the motor shaft or other motivating or supporting part.

According to the invention the motor shaft or other motivating or supporting part is provided with an extension with which a part of the wiper arm is engaged. The arm comprises two sections, pivotally connected and associated with spring means whereby the section connected to the blade is moved relative to the other section toward the windshield glass. The connection between the shaft or supporting extension and section of the arm that engages said extension is such that the tension of the spring maintains it (the connection) substantially rigid, whereby during normal operation the extension and connected arm section move as a unit, but may be disconnected without the use of special tools or implements by manual application of pressure to relieve the pressure effected by the spring.

These and other objects and advantages will become apparent from the following description of the typical embodiment of the invention shown in the accompanying drawing, wherein:

Fig. 1 is a side elevation of a windshield cleaner assembly embodying the invention and mounted upon the header and windshield construction of a vehicle;

Fig. 2 is a longitudinal sectional view of the connecting means and adjacent parts, the broken lines indicating the relative positions of certain of the parts when they are being disconnected;

Fig. 3 is a section taken along line 3—3 of Fig. 2; and

Fig. 4 is a view taken approximately along section line 4—4 of Fig. 1.

As shown in Figs. 1 and 2, a windshield cleaner motor 11 is mounted upon the header construction 12 above the vehicle windshield glass 13, the motor having an angularly oscillating shaft 14 extending forwardly through a tubular extension 15 of the motor housing. Attached to the forward end of shaft 14 is a wiper supporting arm which in turn carries a wiper blade 16, detachably connected to the arm by conventional means 17. The arm comprises two sections,—an elongated casing member 18 secured to the motor shaft and, pivoted thereto, the lower section or arm proper 19.

Motor shaft 14 has at its forward end a radial extension 21 which terminates in an inwardly projecting portion 22. Casing member 18 as shown in Figs. 2 and 4 is channelled to receive shaft extension 21, the channel being formed by the front wall 23, top wall 24, and side walls 25, 25 of member 18. Extending between and connecting walls 25, 25 at the rear face of member 18 is a wall 26 having a forward projection 27. After the member 18 has been emplaced upon shaft extension 21 by moving it from the position shown in broken lines in Fig. 2 to the position shown by full lines, it is rigidly engaged with shaft 14 and extension 21, i. e., side walls 25 engage the extension 21 to prevent relative angular movement about the axis of the shaft, and projection 27 and upper wall 20 of the casing prevent vertical or radial movement of the casing with respect to the shaft. So long as pressure is exerted against the lower end of the casing in a direction away from the windshield the wall 26 is pressed against extension 22 and the upper portion of wall 23 is pressed against the upper portions of extension 21, maintaining the casing 18 keyed with the shaft 14 for movement therewith.

Arm proper 19 is received between the bifurcated portions or lower side walls 28, 28 of the casing section 18 and the upper end of arm 19 is provided with a recess 29 through which passes pivot pin 31 which extends between the bifurcated portions. Arm 19 has a hook 32 extending rearwardly from the axis of the pivot pin for engaging a link 33, the latter being connected to one end of tension spring 34 disposed in the channel of the casing member. The other end of the spring is anchored by pin 35 extending across the channel.

During normal operation of the windshield cleaner the spring 34, by urging movement of hook 32 toward anchor pin 35, performs a threefold function. First it presses the arm 19 toward the windshield glass to press wiper blade 16 into wiping contact with the glass, i. e., urges counter clockwise movement of arm 19 relative to member 18 (as the parts are viewed in Fig. 2). Secondly, by reaction of the force just referred to, it urges the lower end of the casing 18 forwardly relative to the shaft 14, thereby maintaining the keyed relationship between casing 18 and the arm extension 21. Thirdly, it retains the pivot pin 31 seated in recess 29, the spring urging telescopic movement of arm sections 18 and 19.

Arm proper 19 may be detached by moving it forwardly from the windshield about the axis of pivot pin 31 to the position indicated by broken lines at the bottom of Fig. 2 and thence moving it forwardly to disengage the recessed portion from engagement with the pivot pin. Elongated casing member 18 may be removed from the shaft extension 21 by moving its lower end toward the windshield to move its upper wall 24 forwardly of the upper surface of the shaft (to the position indicated in broken lines in the upper portion of Fig. 2) and thence moving the casing section downwardly. In both instances the spring 34 will, of course, resiliently resist the displacing movements.

It will thus be appreciated that the single spring retains the arm proper, upper arm section or casing, and the shaft, in assembled relation and the wiper blade in wiping contact with the glass, and that upon manual movement of the parts, against the tension of the spring, the parts may be disassembled without resort to tools or instruments. It will be understood that the terms "upper", "lower", and the like, are used herein and in the appended claims for convenience of description alone and not in any restrictive sense since the windshield cleaner may be mounted in many different angular positions, as for example at the lower or side edges of windshield rather than at the upper edge as illustrated.

I claim:

1. In a windshield cleaner, a shaft having a radial extension adjacent the forward end thereof, a member detachable from the shaft and having a part bearing upon a surface of said extension that faces toward the windshield surface and having another part bearing upon a forward surface of said shaft, a wiper arm pivoted to said member for movement toward and away from the windshield surface, and a spring acting between the member and wiper arm to urge the wiper arm toward the windshield glass, whereby when movement of the arm toward the glass is resisted said parts of said member will be firmly held against said surfaces of the extension and shaft.

2. In a windshield cleaner, a shaft having a radial extension adjacent the forward end thereof, a member detachable from the shaft and having a recess in its rear face for receiving said extension to restrain the member from relative movement with respect to the shaft about the axis of the latter, said member having a part bearing upon a rear surface of said extension, a wiper arm extending from the member in substantially the same direction that said extension extends from the shaft, and a pivotal connection between the member and arm to permit movement of the arm toward or away from the windshield surface, said connection including spring means for urging movement of the arm relative to the member and toward the windshield surface.

3. In a windshield cleaner, a shaft and a member having one end detachably connected to the shaft, a wiper arm and means pivotally connecting it to the other end of said member, said connecting means including resilient means to urge pivotal movement of the arm relative to said member and toward the windshield surface, the shaft having a radial extension toward the arm, and said member having surfaces engaging a forward surface of the shaft and a surface of the shaft opposite said extension, and said member also having surfaces engaging a rear and a bottom surface of the extension.

4. In a windshield cleaner, a driven shaft terminating at one end in an arm attaching portion, a wiper arm for carrying a wiper and removably mounted on said attaching portion of said shaft, said wiper arm and attaching portion having opposed engaging surfaces facing in opposed directions substantially parallel to the axis of said shaft and normally holding said arm against radial displacement from said attaching portion, said arm attaching portion having a forwardly facing surface, said wiper arm having a rearwardly facing surface engaging and movable away from the forwardly facing surface of the arm attaching portion of said shaft, said arm attaching portion also having a rearwardly facing surface disposed nearer to the wiper carrying arm end than the forwardly facing surface of the said arm attaching portion, said wiper arm having a forwardly facing surface engaging and movable away from the rearwardly facing surface of said shaft attaching portion, all of said engaging surfaces providing a demountable connection between the wiper arm and arm attaching portion of said shaft, said wiper arm being divided into inner and outer end sections having a resilient connection between them normally holding the outer end section against the windshield under resilient pressure and said wiper arm being normally responsive to the action of the resilient connection to maintain said forwardly and rearwardly facing surfaces in operative assembled relation.

ERWIN C. HORTON.